(12) United States Patent
Wu

(10) Patent No.: US 10,606,207 B2
(45) Date of Patent: Mar. 31, 2020

(54) CONNECTING MEMBER AND TRANSMISSION UNIT OF ELECTRONIC IMAGE-FORMING APPARATUS HAVING THE SAME

(71) Applicant: GENERAL PLASTIC INDUSTRIAL CO., LTD., Taichung (TW)

(72) Inventor: Yi-Chia Wu, Taichung (TW)

(73) Assignee: GENERAL PLASTIC INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/545,905

(22) Filed: Aug. 20, 2019

(65) Prior Publication Data

US 2020/0073313 A1 Mar. 5, 2020

(30) Foreign Application Priority Data

Aug. 29, 2018 (CN) ..................... 2018 2 1402080 U

(51) Int. Cl.
*G03G 15/00* (2006.01)
*F16D 3/207* (2006.01)

(52) U.S. Cl.
CPC ........... *G03G 15/757* (2013.01); *F16D 3/207* (2013.01)

(58) Field of Classification Search
CPC ........... G03G 15/7578; G03G 21/1647; G03G 21/1857; G03G 2221/1657; F16D 3/207

USPC ......................... 399/107, 110, 111, 159, 167
See application file for complete search history.

(56) References Cited

U.S. PATENT DOCUMENTS

| | | | | |
|---|---|---|---|---|
| 8,369,722 | B2* | 2/2013 | Takasaka | G03G 15/0121 399/227 |
| 9,062,707 | B2* | 6/2015 | Ikeda | B29D 99/00 |
| 9,690,248 | B2* | 6/2017 | Iijima | G03G 15/757 |
| 9,740,163 | B2* | 8/2017 | Xiao | G03G 21/1857 |

* cited by examiner

*Primary Examiner* — Hoan H Tran
(74) *Attorney, Agent, or Firm* — Muncy, Geissler, Olds & Lowe, P.C.

(57) ABSTRACT

A connecting member includes a plate body having first and second lateral sides, a tube portion extending from the first lateral side and defining a central axis, two resilient arms extending from the second lateral side, two pin holes provided at the two resilient arms respectively and defining an imaginary line passing therethrough and an imaginary plane orthogonal to the imaginary line in a way that the central axis is located on the imaginary plane, and two restricting portions extending from the second lateral side and located at two sides of the imaginary plane in a way that inner peripheries of the two restricting portions are spaced from the central axis at a distance smaller than a distance between inner peripheries of the two resilient arms and the central axis. A transmission unit of an electronic image-forming apparatus having the connecting member is also disclosed.

17 Claims, 7 Drawing Sheets

CONNECTING MEMBER AND TRANSMISSION UNIT OF ELECTRONIC IMAGE-FORMING APPARATUS HAVING THE SAME

BACKGROUND OF THE INVENTION

1. Field of the Invention

The present invention relates generally to an electronic image-forming apparatus and more particularly; to a transmission unit of the electronic image-forming apparatus and a connecting member of the transmission unit.

2. Description of the Related Art

A conventional electronic image-forming apparatus, such as photocopier or printer, is generally equipped with a replaceable toner cartridge therein. Inside the toner cartridge, a plurality of roller units, such as photosensitive roller unit, developer roller unit, etc., are installed. Such roller unit comprises a roller rotatably disposed inside a housing of the toner cartridge. An end of the roller is connected with a connecting member, such that the connecting member and the roller can synchronously rotate. The connecting member is further coupled with a rotational force receiving member, which protrudes outside the housing and is engageable with a driving head provided inside the electronic image-forming apparatus. As a result, when the driving head rotates, the roller is driven by the connecting member via the rotational force receiving member to rotate relative to the housing of the toner cartridge so as to perform a photosensitive or developing work.

To fulfill the requirements of installing the toner cartridge into the electronic image-forming apparatus and dismantling the toner cartridge from the electronic image-forming apparatus, the rotational force receiving member has to be coupled to the connecting member in a freely swingable manner. Therefore, how to assemble the rotational force receiving member with the connecting member to enable that the rotational force receiving member is freely swingable in a certain range of angle without being detached from the connecting member is a technical issue to be solved by the manufacturers in this industry field.

SUMMARY OF THE INVENTION

The present invention has been accomplished in view of the above-noted circumstances. It is an objective of the present invention to provide a transmission unit of an electronic image-forming apparatus, which enables that the rotational force receiving member is freely swingable within a certain range of angle relative to the connecting member without being detached from the connecting member.

Another objective of the present invention is to provide a connecting member adapted to be coupled with a rotational force receiving member in a way that the rotational force receiving member is freely swingable within a certain range of angle relative to the connecting member without being detached from the connecting member.

To attain the above objectives, the present invention provides a transmission unit of an electronic image-forming apparatus, which comprises a rotational force receiving member, a pin and a connecting member. The rotational force receiving member includes a ball connecting portion provided with a through groove, an axle portion having a first end connected with the ball connecting portion, and an engagement portion connected with a second end of the axle portion. The pin is inserted through the through groove of the rotational force receiving member and defines an imaginary plane orthogonally intersected with a center point of the pin. The connecting member includes a plate body, a tube portion extending from a first lateral side of the plate body, two resilient arms extending from a second lateral side of the plate body and being located at two sides of the ball connecting portion, and two restricting portions spacedly extending from the second lateral side of the plate body. Each of the two resilient arms is provided with a pin hole. The pin includes two ends respectively inserted into the two pin holes in a way that the two restricting portions are located by the ball connecting portion of the rotational force receiving member and spacedly located at two sides of the imaginary plane, respectively. As a result, the rotational force receiving member is freely swingable within an angle range relative to the connecting member without being detached from the connecting member.

In another aspect, the present invention provides a connecting member comprising a plate body, a tube portion, two resilient arms, two pin holes, and two restricting portions. The plate body has a first lateral side and a second lateral side opposite to the first lateral side. The tube portion extends from the first lateral side of the plate body and defines a central axis orthogonal to the plate body. The two resilient arms spacedly extend from the second lateral side of the plate body. The two pin holes are provided at the two resilient arms respectively and define an imaginary line passing therethrough and an imaginary plane orthogonal to the imaginary line in a way that the central axis is located on the imaginary plane. The two restricting portions spacedly extend from the second lateral side of the plate body and are located at two sides of the imaginary plane in a way that inner peripheries of the two restricting portions are spaced from the central axis at a same distance D1, inner peripheries of the two resilient arms are spaced from the central axis at a same distance D2, and the distance D1 is smaller than the distance D2. As a result, the connecting member is capable of being coupled with a rotational force receiving member in a way that the rotational force receiving member is freely swingable within an angle range relative to the connecting member without being detached from the connecting member.

BRIEF DESCRIPTION OF THE DRAWINGS

The present invention will become more fully understood from the detailed description given herein below and the accompanying drawings Which are given by way of illustration only, and thus are not limitative of the present invention, and Wherein.

DETAILED DESCRIPTION OF THE INVENTION

Figure 1:
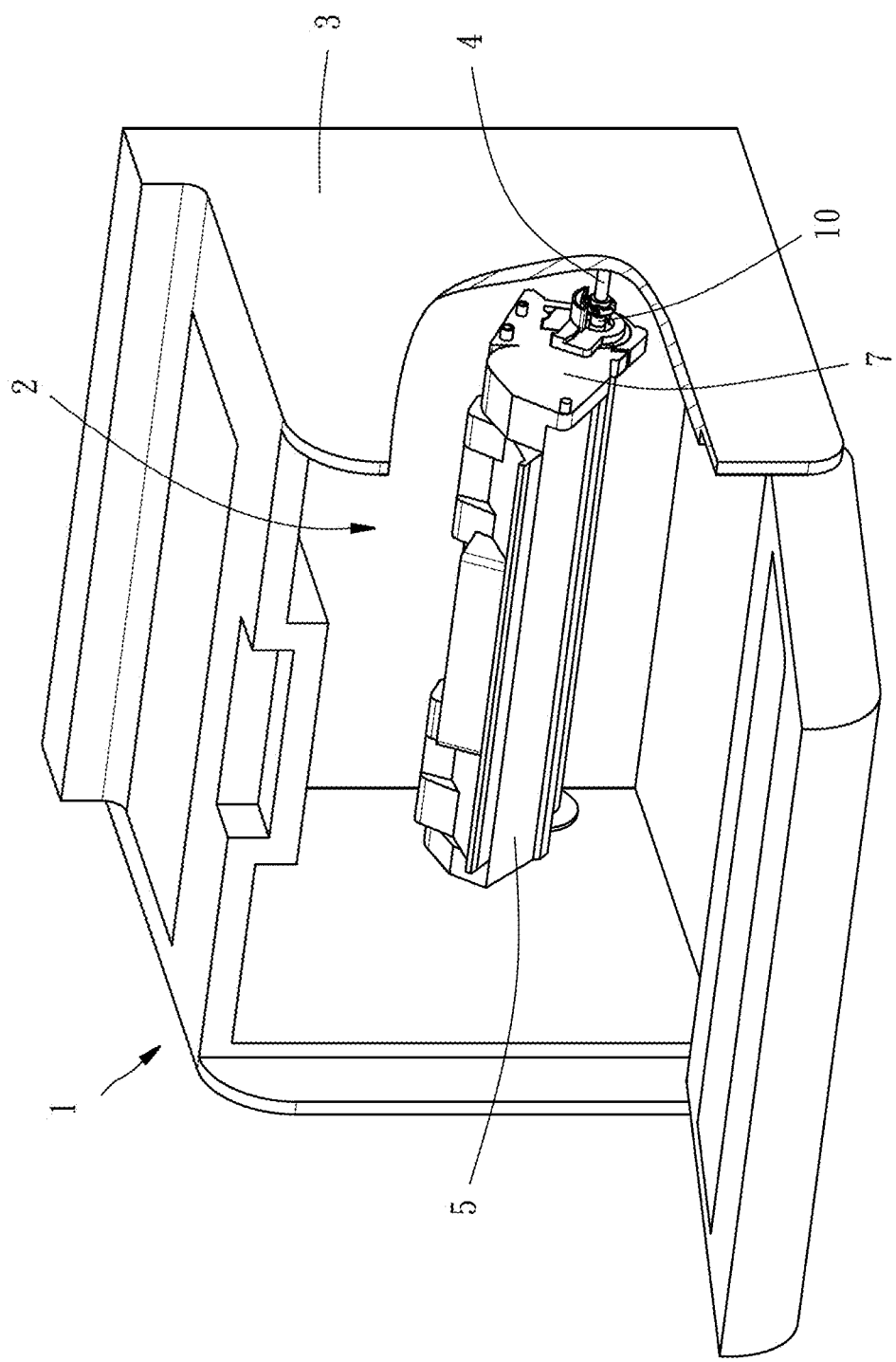
FIG. 1 is a schematically perspective view, showing that a transmission unit in accordance with a first embodiment of the present invention is installed in an electronic image-forming apparatus.

Hereunder three embodiments will be described with accompanying drawings for illustrating technical features and structures of the present invention. As shown in FIG. 1, a transmission unit 10 provided in accordance with a first embodiment of the present invention is disposed in a toner cartridge 5 that is installed inside an electronic image-forming apparatus 1, such as photocopier or printer. Specifically, the electronic image-forming apparatus 1 is provided at an inside thereof with an accommodation 2, in which the toner cartridge 5 is disposed, and a lateral wall 3 disposed with a driving member 4. The driving member 4 extends into the accommodation 2 and is engageable with the transmission unit 10 of the toner cartridge 5 for driving the transmission unit 10 to rotate.

Figure 2:
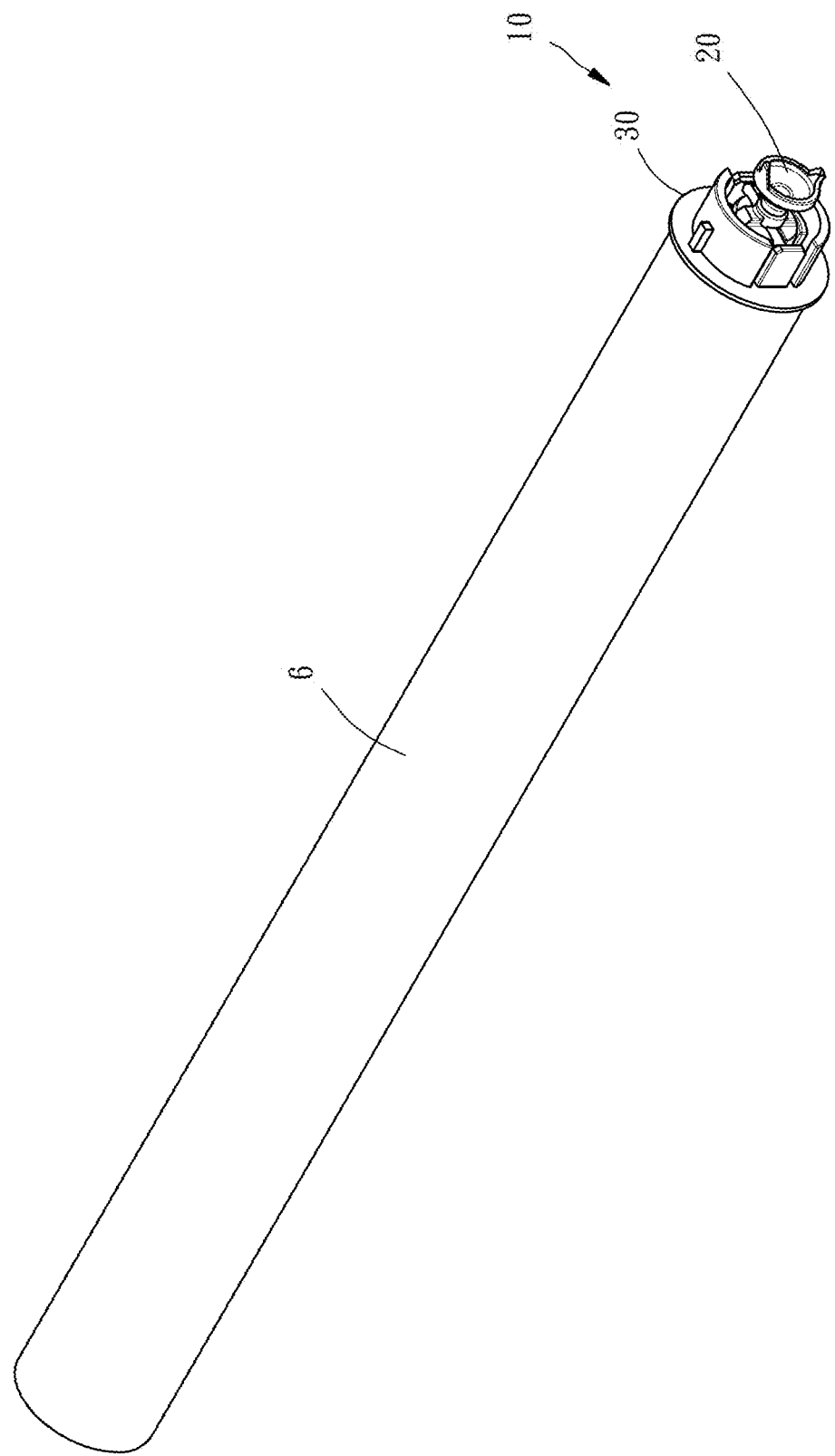
FIG. 2 is a perspective view of the transmission unit in accordance with the first embodiment of the present invention, which is installed with a roller.
Figure 3:
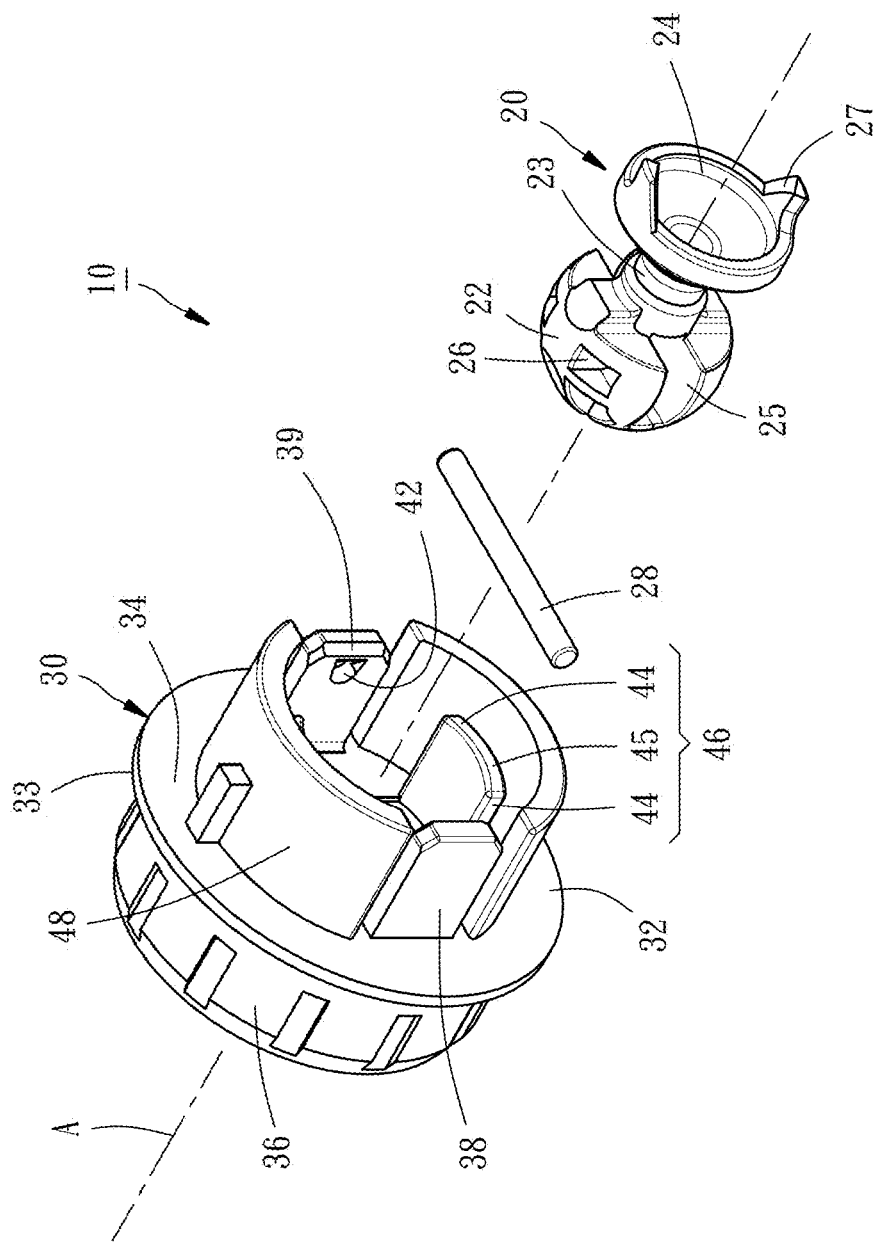
FIG. 3 is an exploded view of the transmission unit in accordance with the first embodiment of the present invention.

As shown in FIGS. 2 and 3, the transmission unit 10 comprises a rotational force receiving member 20, a pin 28, and a connecting member 30 adapted for being connected between a roller 6 and the rotational force receiving member 20. The roller 6 is an elongated circular tube, which may be realized as a photosensitive drum, a developer roller or other functional rollers. The rotational force receiving member 20 can be freely swung within a predetermined angle range relative to the connecting member 30 and can be coupled with the driving member 4. As such, when the driving member 4 rotates, the roller 6 can be driven by the connecting member 30 via the rotational force receiving member 20 to rotate so as to perform a photosensitive or developing work.

As shown in FIG. 3, the rotational force receiving member 20 comprises a ball connecting portion 22, an axle portion 23 having a first end connected with the ball connecting portion 22, an engagement portion 24 connected with a second end of the axle portion 23, and a rectangular through groove 25 provided at the ball connecting portion 22. Though several hollow portions 26 are provided on the surface of the ball connecting portion 22, the ball connecting portion 22 has an overall profile like a ball body slightly greater than a hemisphere. The engagement portion 24 has two claw hooks 27 adapted for being coupled to the driving member 4.

The pin 28 is inserted through the through groove 25 of the rotational force receiving member 20. Since the dimension of the through groove 25 is far greater than that of the pin 28, the rotational force receiving member 20 can move and swing relative to the pin 28 within a certain range when the pin 28 is fixedly mounted. Further, as shown in FIG. 4, an imaginary plane P is defined as being orthogonally intersected with a center point of the pin 28 to evenly divide the pin 28 into two halves.

Figure 4:
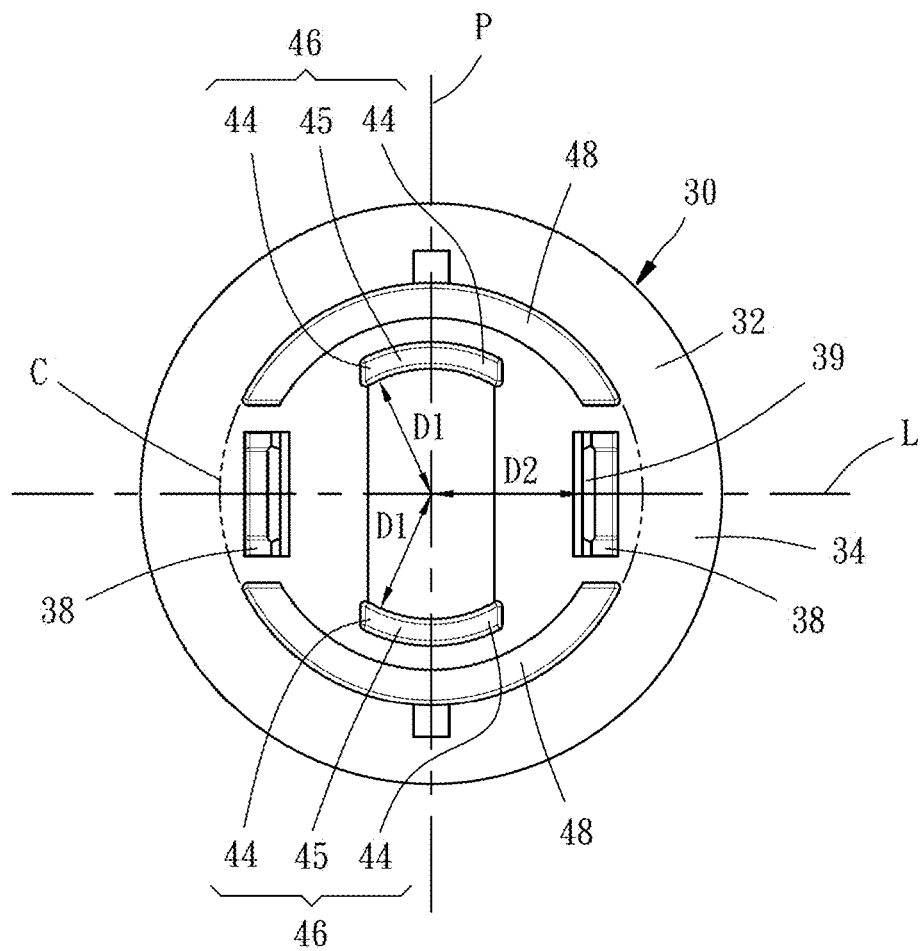
FIG. 4 is a lateral side view of a connecting member of the transmission unit in accordance with the first embodiment of the present invention.

As shown in FIGS. 3 and 4, the connecting member 30 comprises a circular plate body 32, a tube portion 36 extending from a first lateral side 33 of the plate body 32, two resilient arms 38 extending from a second lateral side 34 of the plate body 32 in a way that the two resilient arms 38 are located at left and right sides of the ball connecting portion 22 as being viewed from FIG. 3, two pin holes 42 provided respectively at the face-to-face sides of the two resilient arms 38, four restricting portions 44 spacedly extending from the second lateral side 34 of the plate body 32, and two arc walls 48 extending from the second lateral side 34 of the plate body 32 and located at front and rear sides of the ball connecting portion 22.

The tube portion 36 is adapted for being inserted into the roller 6 so as to connect the connecting member 30 with the roller 6. The tube portion 36 defines a central axis A that is orthogonal to the plate body 32. The first lateral side 33 is a back or opposite side of the second lateral side 34. The terminal ends of the two resilient arms 38 can be forced by an external force to move outwardly so as to facilitate insertions of two ends of the pin 28 into the pin holes 42, respectively. As soon as the external force is released, the two resilient arms 38 will rebound to their initial postures to fixedly mount the pin 28 to the connecting member 30. The two pin holes 42 combinedly define an imaginary line L passing therethrough and the imaginary plane P is orthogonal to the imaginary line L in a way that the central axis A is located on the imaginary plane P.

Figure 5:
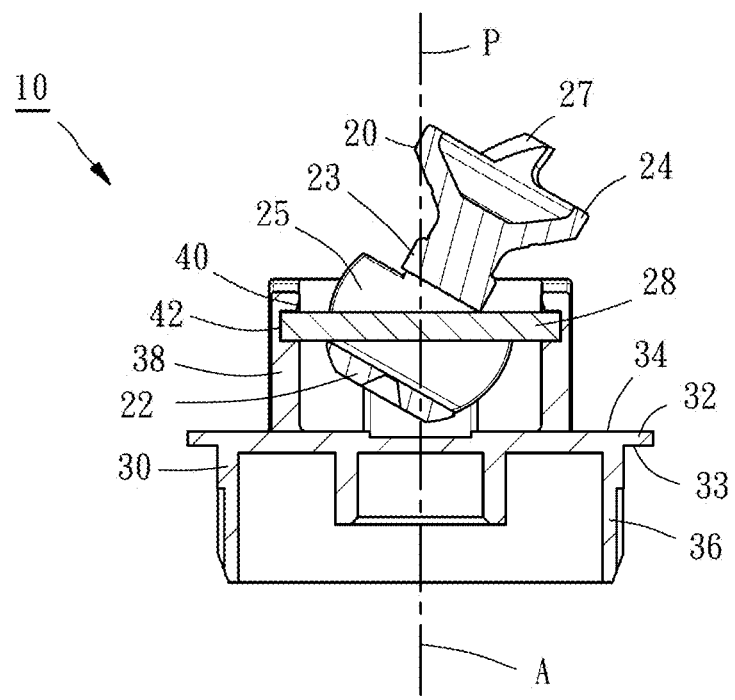
FIG. 5 is a sectional view of the transmission unit taken alone an axis of a pin of the transmission unit in accordance with the first embodiment of the present invention.
Figure 6:
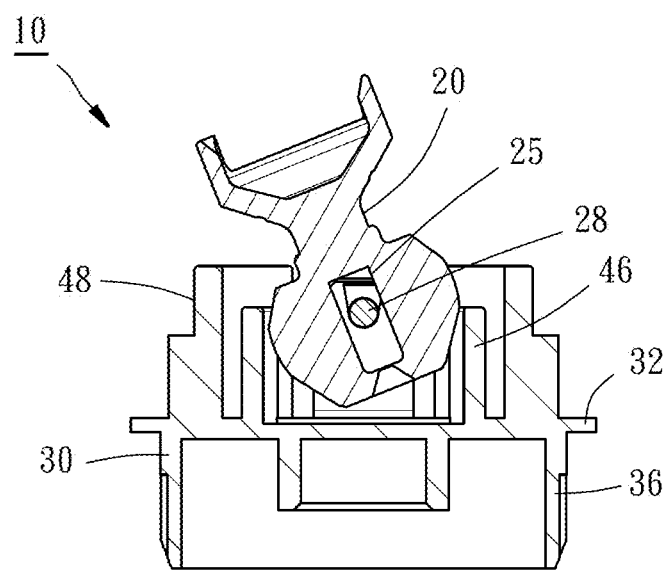
FIG. 6 is another sectional view of the transmission unit taken alone a sectional plane orthogonal to the axis of the pin in accordance with the first embodiment of the present invention.

Those restricting portions 44 are located by the ball connecting portion 22 of the rotational force receiving member 20 and located at two sides of the imaginary plane P for restricting the movement of the ball connecting portion 22 in a direction parallel or orthogonal to the extending direction of the pin 28 with a certain range. As shown in FIG. 4, two of the restricting portions 44, which are located at a same side of the pin 28, are connected with each other by a bridge portion 45 to form a restricting wall 46. That is, from another point of view, the two ends of the restricting wall 46 form the two restricting portions 44. Further, the two restricting walls 46 are spacedly located at two sides of the imaginary line L in a way that inner peripheries of the four restricting portions 44 are spaced from the central axis A at a same distance D1, inner peripheries of the two resilient arms 38 are spaced from the central axis A at a same distance D2, and the distance D1 is smaller than the distance D2, i.e. D1<D2. The four restricting portions 44 (or the two restricting walls 46) restrict the movement of the ball connecting portion 22 of the rotational force receiving member 20 in a direction parallel or orthogonal to the extending direction of the pin 28 but allow rotation of the ball connecting portion 22 at its place. By means of such structural design, the ball connecting portion 22 of the rotational force receiving member 20 can be substantially held on the central axis A and the rotational force receiving member 20 is freely swingable within a certain angle range relative to the connecting member 30 without being detached from the connecting member 30, as shown in FIGS. 5 and 6, thereby achieving the objectives of the present invention.

Further, as shown in FIG. 4, the two arc walls 48 are located at two sides of the imaginary line L in such a way that the outer peripheries of the two arc walls 48 are located on an imaginary circle C, resulting in that when the connecting member 30 is installed in a housing 7 of the toner cartridge 5, the arc walls 48 can be abutted with the housing 7 for positioning so as to enable the transmission unit 10 to rotate about the central axis A. To facilitate installation of the pin 28 into the pin holes 42, each of the two resilient arms 38 has a terminal end provided with an outer chamfered portion 39, as shown in FIG. 3, and an inner chamfered portion 40 provided at an edge of respective pin hole 42 and located adjacent to respective outer chamfered portion 39, as shown in FIG. 5. As soon as the toner cartridge 5 is installed into the electronic image-forming apparatus 1, the rotational force receiving member 20 can be smoothly coupled to the driving member 4, such that when the driving member 4 rotates, the roller 6 is driven by the connecting member 30 via the rotational force receiving member 20 to rotate so as to achieve developing or photosensitive function.

Figure 7:
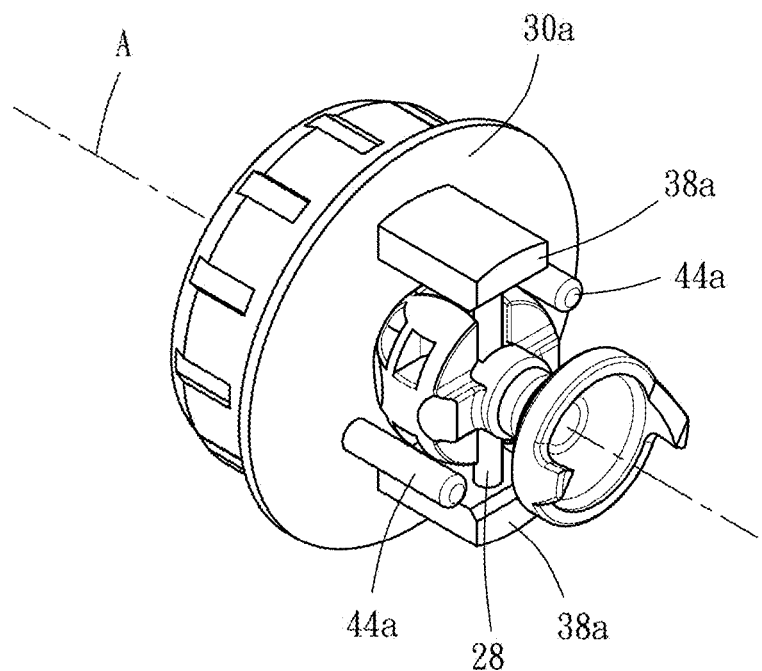
FIG. 7 is a perspective view of a transmission unit in accordance with a second embodiment of the present invention.
Figure 8:
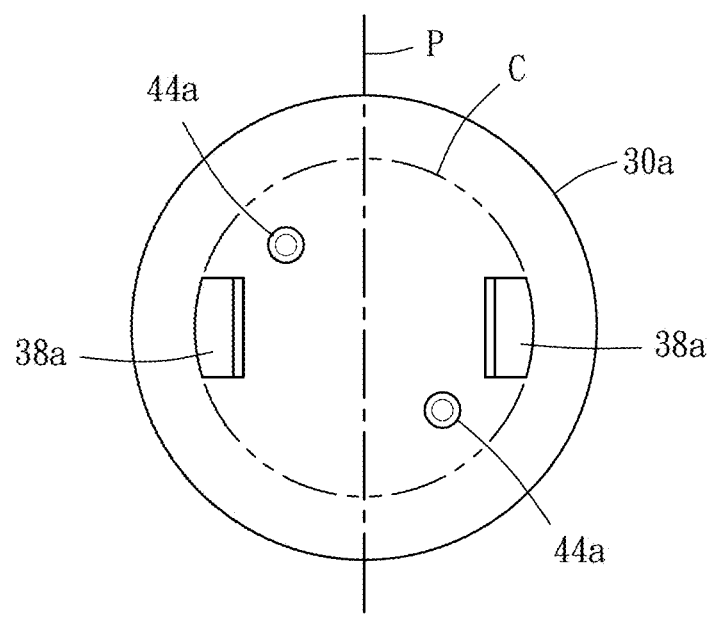
FIG. 8 is a lateral side view of a connecting member of the transmission unit in accordance with the second embodiment of the present invention.

Based on the above-disclosed technical features, various modifications to the structure of the connecting member may be made. For example, FIG. 7 shows a connecting member 30a in accordance with a second embodiment of the present application. The structure of the connecting member 30a is basically the same as that of the connecting member 30 of the first embodiment, except that the connecting member 30a of this embodiment has no arc walls and the resilient arms 38a are configured in a way that the outer peripheries of the two resilient arms 38a are located on an imaginary circle. That is, the two resilient arms 38a, which play the role of the arc walls 48 disclosed in the first embodiment, are adapted to be abutted against the housing 7 of the toner cartridge 5. Further, the connecting member 30a has two restricting portions 44a located at two sides of the imaginary plane P and at two sides of the pin 28, respectively. In this embodiment, the two restricting portions 44a are formed by two posts. As such, the two restricting portions 44a can restrict the movement of the ball connecting portion 22 in a direction parallel to the extending direction of the pin 28 to enable that the ball connecting portion 22 of the rotational force receiving member 20 can be substantially held on the central axis A, thereby achieve the objectives of the present invention.

Figure 9:
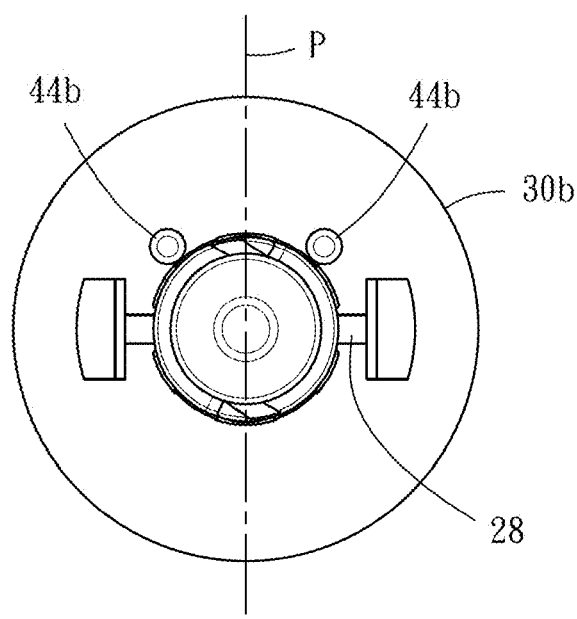
FIG. 9 is a lateral side view of a connecting member of a transmission unit in accordance with a third embodiment of the present invention.

Another modification to the structure of the connecting member may be available. FIG. 9 shows a connecting member 30b in accordance with a third embodiment of the present application. The structure of the connecting member 30b is basically the same as that of the connecting member 30a of the second embodiment, except that the two restricting portions 44b are located at two sides of the imaginary plane P but at a same side of the pin 28. With this structural design, the two restricting portions 44b can also restrict the movement of the ball connecting portion 22 in a direction parallel to the extending direction of the pin 28, thereby achieve the objectives of the present invention.

In fact, as long as the ball connecting portion 22 of the rotational force receiving member 20 can be restricted at a position around the central axis A, the shape, location and number of the restricting portions 44 are not limited to those disclosed in the precedent embodiments of the present invention under the condition that at least two restricting portions 44 are located at two sides of the imaginary plane P.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission unit of an electronic image-forming apparatus, comprising:
   a rotational force receiving member including a ball connecting portion provided with a through groove, an axle portion having a first end connected with the ball connecting portion, and an engagement portion connected with a second end of the axle portion;
   a pin inserted through the through groove of the rotational force receiving member and defining an imaginary plane orthogonally intersected with a center point of the pin; and
   a connecting member comprising a plate body, a tube portion extending from a first lateral side of the plate body, two resilient arms extending from a second lateral side of the plate body in a way that the two resilient arms are located at two sides of the ball connecting portion, two pin holes, each of which is provided at one of the resilient arms, and two restricting portions spacedly extending from the second lateral side of the plate body;
   wherein the pin includes two ends respectively inserted into the two pin holes in a way that the two restricting portions are located by the ball connecting portion of the rotational force receiving member and spacedly located at two sides of the imaginary plane, respectively.

2. The transmission unit of the electronic image-forming apparatus as claimed in claim 1, wherein the connecting member further comprises two arc walls extending from the second lateral side of the plate body and located at two sides of the ball connecting portion; outer peripheries of the two arc walls are located on an imaginary circle.

3. The transmission unit of the electronic image-forming apparatus as claimed in claim 1, wherein the tube portion defines a central axis orthogonal to the plate body; inner peripheries of the two restricting portions are spaced from the central axis at a same distance D1; inner peripheries of the two resilient arms are spaced from the central axis at a same distance D2 and the distance D1 is smaller than the distance D2.

4. The transmission unit of the electronic image-forming apparatus as claimed in claim 1, wherein outer peripheries of the two resilient arms are located on an imaginary circle.

5. The transmission unit of the electronic image-forming apparatus as claimed in claim 1, wherein the two restricting portions are connected by a bridge portion to form a restricting wall.

6. The transmission unit of the electronic image-forming apparatus as claimed in claim 5, wherein the connecting member comprises two said restricting walls spacedly located at two sides of the pin.

7. The transmission unit of the electronic image-forming apparatus as claimed in claim 1, wherein the two restricting portions are formed by two posts.

8. The transmission unit of the electronic image-forming apparatus as claimed in claim 1, wherein each of the two resilient arms has a terminal end provided with an outer chamfered portion.

9. The transmission unit of the electronic image-forming apparatus as claimed in claim 8, wherein each of the two resilient arms has an inner chamfered portion provided at an edge of the pin hole and located adjacent to the outer chamfered portion.

10. A connecting member comprising:
    a plate body having a first lateral side and a second lateral side opposite to the first lateral side;
    a tube portion extending from the first lateral side of the plate body and defining a central axis orthogonal to the plate body;

two resilient arms spacedly extending from the second lateral side of the plate body;

two pin holes provided at the two resilient arms respectively and defining an imaginary line passing therethrough and an imaginary plane orthogonal to the imaginary line in a way that the central axis is located on the imaginary plane; and two restricting portions spacedly extending from the second lateral side of the plate body and located at two sides of the imaginary plane in a way that inner peripheries of the two restricting portions are spaced from the central axis at a same distance D1, inner peripheries of the two resilient arms are spaced from the central axis at a same distance D2, and the distance D1 is smaller than the distance D2.

11. The connecting member as claimed in claim 10, further comprising two arc walls extending from the second lateral side of the plate body and located at two sides of the imaginary line; outer peripheries of the two arc walls are located on an imaginary circle.

12. The connecting member as claimed in claim 10, wherein outer peripheries of the two resilient al ins are located on an imaginary circle.

13. The connecting member as claimed in claim 10, wherein the two restricting portions are connected by a bridge portion to form a restricting wall.

14. The connecting member as claimed in claim 13, comprising two said restricting walls spacedly located at two sides of the imaginary line.

15. The connecting member as claimed in claim 10, wherein the two restricting portions are formed by two posts.

16. The connecting member as claimed in claim 10, wherein each of the two resilient arms has a terminal end provided with an outer chamfered portion.

17. The connecting member as claimed in claim 16, wherein each of the two resilient arms has an inner chamfered portion provided at an edge of the pin hole and located adjacent to the outer chamfered portion.

* * * * *